Aug. 4, 1925.

M. F. NEWMAN 1,548,160

APPARATUS FOR FILTERING AND SOFTENING WATER

Filed April 20, 1922 2 Sheets-Sheet 1

WITNESSES
A. B. Wallace.
Jo. Baily Brown

INVENTOR
Martin F. Newman
by Winter & Brown
his ATTORNEYS

Aug. 4, 1925.                                                                  1,548,160
M. F. NEWMAN
APPARATUS FOR FILTERING AND SOFTENING WATER
Filed April 20, 1922                    2 Sheets-Sheet 2
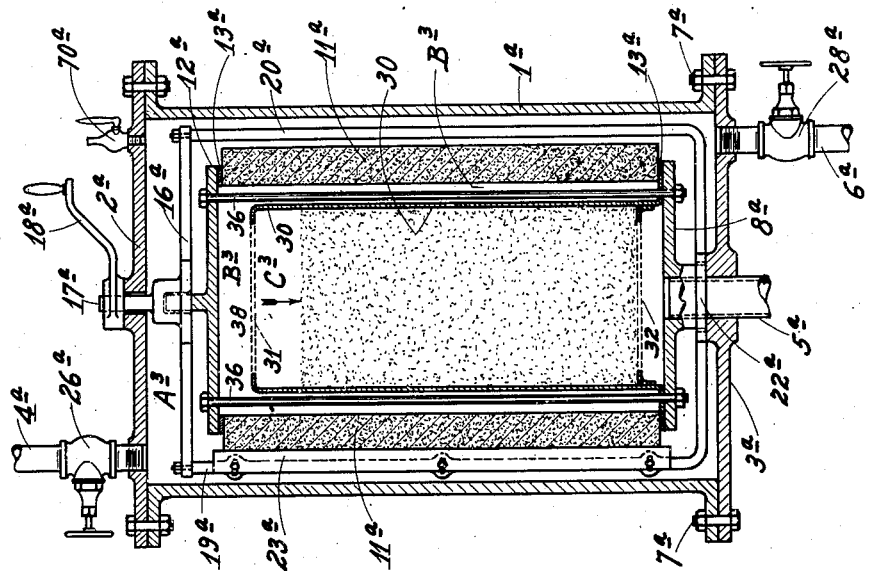
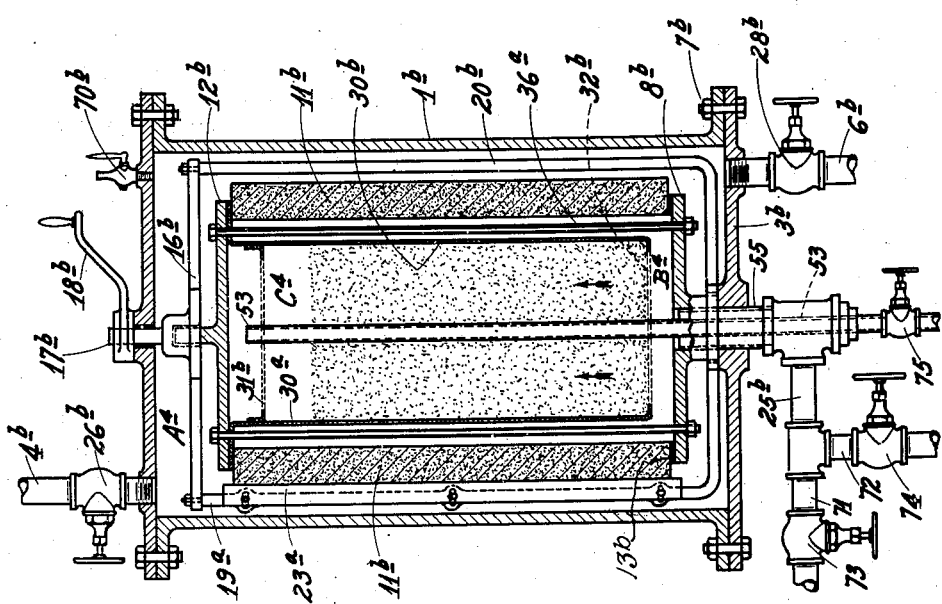
WITNESSES
INVENTOR
Martin F. Newman
by Winter & Brown
his ATTORNEYS Patented Aug. 4, 1925.

1,548,160

UNITED STATES PATENT OFFICE.

MARTIN F. NEWMAN, OF OAKMONT, PENNSYLVANIA, ASSIGNOR TO WM. B. SCAIFE & SONS COMPANY, OF OAKMONT, PENNSYLVANIA, A CORPORATION OF PENNSYLVANIA.

APPARATUS FOR FILTERING AND SOFTENING WATER.

Application filed April 20, 1922. Serial No. 555,756.

*To all whom it may concern:*

Be it known that I, MARTIN F. NEWMAN, a citizen of the United States, and a resident of Oakmont, in the county of Allegheny and State of Pennsylvania, have invented a new and useful Improvement in Apparatus for Filtering and Softening Water, of which the following is a specification.

This invention relates to apparatus for filtering and softening water. More particularly it relates to means for filtering out suspended impurities, and at the same time and in the same apparatus softening the water after filtering. By simultaneously as hereinafter used in this connection is meant the carrying out of both processes at the same time in the same apparatus, although the water itself is treated to the two processes separately and seriatim.

Among the special objects of the invention, one is to provide a unitary apparatus in which there may be positioned in a single casing or container means for filtering water delivered thereto, and softening it in the same container. By the means employed complete filtration is insured in advance of the softening treatment. Another object is to provide space for the softening element inside the filtering element, so that the space necessary for the latter comprises that necessary for the softening element. Another object is to provide a container in which may be used a softening medium of very small particles, thus rendering available for use the fines of zeolite, which are ordinarily not useful on account of their size.

Means are also provided for rendering accessible the various parts of the apparatus, cleaning and renewing the filtering element, and means to regenerate the softening element.

The many uses and advantages of this apparatus will be apparent to those familiar with the art.

Figure 2:
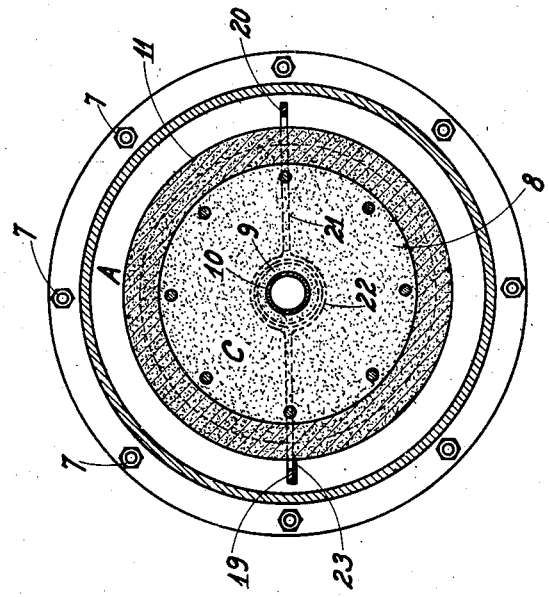
Figure 1:
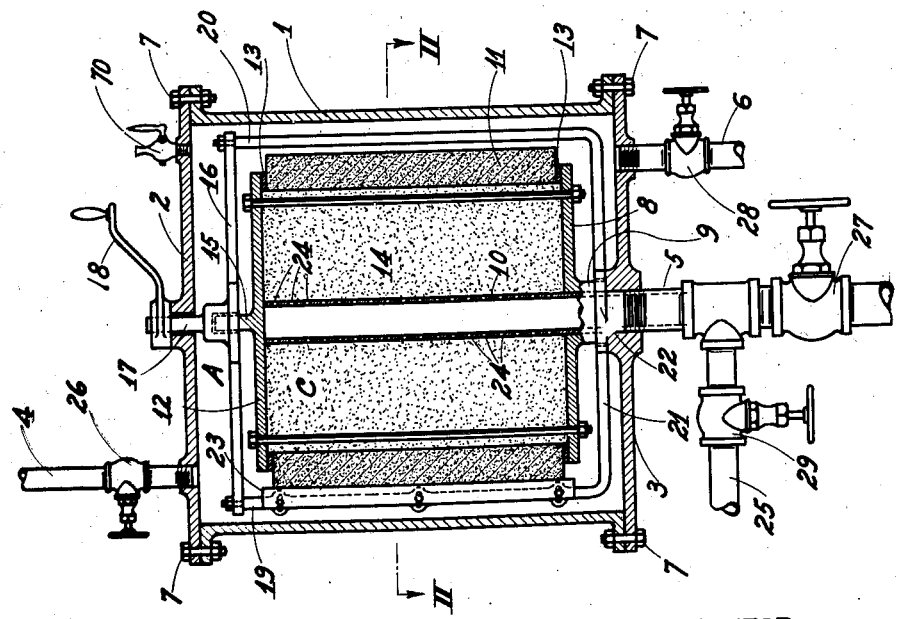

Referring to the drawings, Fig. 1 shows a preferred embodiment of the device, in central vertical section; Fig. 2 is a horizontal section on the line II—II of Fig. 1; Fig. 3 a modification in which the softening element is contained in a separate shell, and means provided for securing a downward flow of water through the softening element, the whole device being shown in central vertical section; and Fig. 4 shows in central vertical section another modification in which the softening element is contained within the filtering element, but in a separate shell, and so arranged that the water being treated passes upwardly through the softening material.

In apparatus for purifying water, in small quantities, as for example for drinking purposes in homes, office buildings, hotels and the like, and for making soft drinks and carbonated beverages, there are two essential steps, by which the water is carried to its highest degree of purity. Suspended impurities such as bacteria, earth, precipitated matter resulting from the introduction of chemicals and the like may be successfully removed by filtering the water through any of the usual forms of mechanical filters, as for example sand, crushed quartz, or other like material. Such treatment, however, will not to any material degree, affect chemical impurities in solution, as for example some iron, calcium and magnesium compounds, various coloring elements, and the chemicals that go to make what is called a " hard " water. In other words, this filtering will not result in complete purification.

In order to secure the best possible result for complete purification of water the most economical treatment is that of passing the water after filtration, to remove suspended impurities, through a zeolite. This is a clay-like chemical compound, occurring naturally and also manufactured, which has the property of softening water that is brought into intimate contact therewith, by exchange of sodium for calcium and magnesium. After having treated a certain volume of water, however, zeolite compounds have to be regenerated by treatment with a solution of sodium chloride. Consequently, with zeolite filters it is necessary to make arrangements to provide means for passing a salt solution through the softening medium, and this is ordinarily done by providing connections by which the main flow of water may be cut off, and the salt solution introduced, which is drawn off by any convenient piping system.

Although both the filtering of water, and softening with zeolite compounds and the like have been heretofore used, so far as I know apparatus for furnishing both treatments to water, at the same time, and combined in a unitary tank, and particularly with the zeolite contained inside the filtering element itself, have not been used.

Furthermore, where the filtering is done separately with sand or quartz filters, which is usual, and then followed with a zeolite softening treatment, there have been found a number of difficulties that are avoided by the present construction. For example, unless the filtration is very thorough, such as that obtainable with a tripoli stone or porous earthenware a certain amount of organic matter and aluminum compounds in solution or in suspension, is delivered to the zeolite. Oxygen tends to collect in the zeolite. When these impurities come in contact with the porous zeolite there is a tendency for the organic matter to become oxidized so that a part of it comes out of solution and is deposited on the surface of the zeolite. This interferes with further reactions, and has an insulating effect on the zeolite. The zeolite, therefore, rapidly loses its capacity for softening the water under such circumstances. Sometimes the raw water is contaminated with traces of oil. This is not always effectively removed by the ordinary sand filter. An infinitesimal quantity of oil produces a rapid deterioration of the efficiency of a zeolite by insulating it from the water. Iron in solution is very common. This may be largely removed by a proper filter, but traces of it will pass through a sand filter, and especially in the presence of organic matter, this small amount of iron forms a precipitate and tends to cause a clogging up of the interstices of the granular zeolite. All of these difficulties of the present practice are in part obviated by my construction, which absolutely insures the most thorough filtration prior to contact with the zeolite of the water being treated.

Referring to the drawings Fig. 1 shows a unitary filtering apparatus comprising an outer casing 1 having a cover plate 2, a bottom plate 3, an inlet pipe 4, an outlet pipe 5, and a drain pipe 6, the latter preferably leading to a sewer.

It will be understood that the top and bottom of this casing are firmly attached in any suitable manner as by bolts 7, and are packed so as to furnish a water tight joint. The same is true of the pipe 5, with respect to the bottom wall. All of this is to prevent leakage of water from the casing.

Positioned inside the main casing is a circular supporting member 8, having a central supporting extension 9, which seats on the bottom wall 3 of the main container. The flange 9 surrounds a perforated vertical extension 10 of the pipe 5. A cylindrical filter shell 11 seats upon the outer edge of the supporting member 8. This shell 11 carries at its top a circular plate 12, which seats upon the upper edge of the shell 11, and forms a closure cap therefor. The perforated pipe 10 extends upward to contact with the lower face of the plate 12, making a water tight connection therewith. The members 8 and 12 have a suitable packing 13 positioned between themselves and the edges of the shell 11, so that the three members form a water tight cylindrical chamber 14, as will be obvious. The perforated drawoff member 10 is situated in the central portion of this chamber 14, and extends out through water tight packings to connect with the pipe 5.

At its central point the plate 12 has a vertical upward extension 15, which forms a bearing or trunnion for a cross head 16, connected by vertical shaft 17 to an exterior handle 18, by which the cross head 16 may be turned. At the outer ends of this cross member there are vertical side extensions 19 and 20, and these are connected at their lower ends by a second cross head 21, which has a bearing 22 surrounding the circular flange 9, so that the frame formed by the members 16, 19, 20 and 21 may be rotated upon the members 15 and 9, in obvious manner. The inner face of the member 19 carries a cutting blade 23, which is adjustably mounted, and so arranged that the edge constantly bears against and scrapes the outer surface of the shell 11, when the frame is rotated by means of handle 18. This particular construction is old, and is not claimed as any part of this invention per se.

The shell 11 is made of some fine grained porous material, such as an earthenware composition, or may be formed directly from a natural stone, such as that known in the art as "tripoli." This latter stone is particularly good for filtering out mechanical impurities, and will itself remove practically every foreign element from water except only those which are in complete solution.

The chamber 14 is filled with zeolite, or some similar element. This may be, and in fact, is preferably reduced to a fine form, since, as is well known, the more intimately such a softening element comes into contact with water being treated the more readily and quickly does it soften the water. Consequently the fine zeolite will treat a larger volume of water in a given time than a coarse zeolite.

Furthermore, there is a distinct advantage in using the fine material, since it is more easily and quickly revived by application of salt water.

With the filters as heretofore used the fines of zeolite could not be utilized, since they passed through the mesh of the filter containers or shells as constructed. But with the arrangement shown in Fig. 1, where the zeolite is contained within a chamber which is bounded by two solid plates, and a shell of porous material such as tripoli stone, zeolite of any degree of fineness may be safely and advantageously employed. This permits the use of what has heretofore been considered a waste material.

The operation of this form of my invention is as follows:—

The casing 1 is connected up to a water supply pipe 4, and to the pipe 5 leading to the draw off spout. That is to say, the device is connected up directly in a supply pipe, so that water may be drawn off and used as desired, and the purifying element acts whenever water is drawn through it. When a faucet or other outlet from the pipe 5 is opened, water passes out through this pipe. At the same time water is supplied to the main container through the pipe 4, and this water is filtered through the porous shell 11. This shell removes and holds on its outer surface substantially all of the mechanical or solid impurities of the water delivering to the inner side a water from which bacteria and solid material has been removed, but which may be "hard" from the presence of such impurities in solution as iron, lime and the like. This filtered water then passes towards the center of the container, through the powdered zeolite medium contained in the chamber 14, and thence through the perforations 24 in the pipe 10 to the interior thereof from which it may be drawn off through the pipe 5 in obvious manner.

In passing through the zeolite impurities which render the water hard, are removed, and there is delivered to the pipe 5 a water which has been in turn mechanically filtered, and then chemically softened, and which is at the highest degree of purity for all ordinary purposes.

From time to time, according to the amount of use, the exterior of the filter shell 11 is scraped free from the collected impurities that have been filtered out of the water, by rotating the handle 18, that causes the cutting blade 23 to scrape the entire outer wall of the shell 11. Such filters when made of tripoli stone, may be used until they are practically cut away by the scraping process. By shutting off the pipe 5, after this scraping operation, opening the pipe 6, and allowing water to flow through pipe 4, the chamber A, surrounding the shell 11, may be entirely flushed and the sediment carried off to the sewer through the drain pipe 6. Similarly, by introducing a reverse flow of salt water through the pipe 25, the zeolite may be revived and restored to its original strength.

Valves, 26, 27, 28 and 29 are provided in pipes 4, 5, 6 and 25, respectively, for providing desired disposal of water in obvious manner.

In Fig. 3 a modification is shown in that the zeolite is contained in a metal shell forming a partitioning member 30, which has a screen 31 at the top, and another screen 32 at the bottom, adapted to contain the granulated zeolite between. Partitioning member 30 is supported upon a plate $8^a$, which in turn supports the porous filter shell $11^a$. Another plate $12^a$ seats upon the top of the filter shell, and this plate is clamped to the plate $8^a$ by means of vertical rods 36. Suitable packing members $13^a$ are positioned between the plates $8^a$, $12^a$, and the edges of the cylindrical filter member $11^a$.

Scraping means similar to that described in connection with Fig. 2 are provided. These have similar reference numerals to those referred to in connection with Fig. 2.

In this modification the imperforate shell or partitioning member 30 is smaller than the interior wall of the filter $11^a$, and therefore provides an annular chamber $B^3$ surrounding the shell or partitioning member 30. Raw water is admitted to this apparatus through the pipe $4^a$, passes into the chamber $A^3$, through the filtering wall $11^a$, into the chamber $B^3$, over the top of the shell 30, downward through the screen 31, and through the zeolite contained in the main compartment $C^3$, through the lower screen 32, and thence through the outlet pipe $5^a$.

This filter may be cleaned by scraping the outer portion of the shell, with the means illustrated, and the zeolite may be revived by providing a reverse flow of the salt solution through the pipe $5^a$, the pipe $4^a$ being closed, and the water drawn off through the drain pipe $6^a$.

Another modification is shown in Fig. 4, wherein means are provided for securing an upward flow of the filtered water through the zeolite solution. In this embodiment the zeolite is contained in the water tight shell $30^a$, which is clamped at its top to the closure plate $12^b$, its lower end being closed by a filter screen $32^b$, which supports the zeolite filling the chamber $C^4$. A central draw off pipe 53 extends upwards through the chamber $C^4$ above the filter screen $31^b$, positioned near the upper end of the shell $30^a$. The draw off pipe 53 extends out through a larger draw off pipe 55, through the bottom wall $3^b$ of the main container.

Means for scraping the exterior of the filter shell $11^b$, similar to that described in connection with that of Fig. 1, are provided.

The filter shell is clamped at its upper and lower edges between the plates $8^b$ and $12^b$, with intermediate water tight packing members $13^b$.

In this embodiment raw water passes into the main container 1ᵇ, through the inlet pipe 4ᵇ, into the chamber A⁴, which surrounds the filtering shell 11ᵇ. The water passes inwardly through this shell, which removes the impurities, oil and other viscous matter, and thence into the chamber B⁴, which surrounds the imperforate shell 30ᵃ. The water passes upward through the screen 32ᵇ, and through the zeolite contained in the chamber C⁴, through the screen 31ᵇ, and then flows away through draw off pipe 53, to the point where it is used.

When it is desired to clean this filter the draw off pipes 53 and 55 are closed, the scraping apparatus is actuated, the drain pipe 6ᵇ is opened and water is admitted through the pipe 4ᵇ, thus flushing out the chamber A⁴ and being drawn off to a sewer through the pipe 6ᵇ.

To revive the zeolite the pipes 4ᵇ and 6ᵇ are closed, salt solution is introduced in reverse flow through the pipe 25ᵇ, flows upward through the zeolite and is drawn off through the pipe 53.

In this modification of Fig. 4, water that has been filtered but not softened may be drawn off for drinking purposes, by closing valves 75 and 73 in pipes 53 and 71 respectively, and opening valve 74 in pipe 72. The operation is obvious.

It will be apparent in this specification that I have provided a unitary apparatus contained in a single tank, whereby water may be continuously filtered and softened. Convenient means are provided for cleaning the filter and regenerating the softening medium. The filtering member encloses the softening element, and the latter is so arranged and supported that the finest particles thereof may be utilized, with a consequent saving of otherwise wasted material, and at the same time securing a more intimate and immediate contact of the water with the softening means.

I claim:

1. A filtering and softening apparatus comprising a main container, a shell of filtering material positioned inside the main container, a body of softening material positioned inside an impervious open ended container inside the filtering shell, and connections whereby to deliver water to the outside of said filtering shell and to draw it off beyond said softening element after it has passed successively through the filtering shell and from end to end of the softening element.

2. Apparatus for filtering and softening water comprising a main water-tight container having water inlet and outlet connections, a shell of porous filtering material positioned inside the main container and having its ends closed with water-tight members, a partitioning member positioned within the filtering shell spaced away therefrom and filled with a water softening material, a drawoff pipe leading from within said partitioning member and adapted to carry away water after it has passed through the filtering shell and softening medium, and a drawoff pipe adapted to supply water after it has passed through the filtering shell and before it has passed through the softening means.

3. Apparatus for filtering and softening water comprising a main water-tight container having a water inlet and outlet connection, a shell of porous filtering material positioned inside the main container and having its ends closed with water-tight members, a partitioning member positioned within the filtering shell spaced away therefrom and filled with a water softening material, and a drawoff pipe leading from within said partitioning member and adapted to carry away water after it has passed through the filtering shell and softening medium.

4. In a unitary apparatus for filtering and softening water, the combination of a water-tight container, an inlet pipe for admitting raw water thereto, a draw-off pipe for taking away the treated water, a pervious filter shell positioned inside and spaced from the wall of the container, the inlet pipe leading into the container outside said shell and the outlet pipe leading off from inside said shell, a mass of water softening material positioned inside the filter shell and in the path of flow of water from the filter shell to the draw-off pipe, said mass of softening material being of uniform thickness with respect to the passage therethrough of water traveling from the filter shell to the draw-off pipe.

5. A unitary water filtering and softening apparatus comprising a main water-tight container, an inlet pipe adapted to admit raw water to the container, a shell of porous filtering material positioned in the container and spaced away from the inner walls thereof, an impervious open-ended shell containing a mass of softening material positioned inside the filter shell, a drawoff pipe opening beyond the mass of softening material and extending to the outside of the container, the mass of softening material being distributed in uniform thickness with respect to the path of flow of water between the filter shell and the opening of the draw-off pipe, whereby to draw off water after it has passed through the filter and through the mass of softening material.

6. A unitary water filtering and softening apparatus comprising a main water-tight container, an inlet pipe adapted to admit raw water to the container, a shell of porous filtering material positioned in the container and spaced away from the inner walls thereof, an imperforate open ended shell containing a mass of softening material positioned inside the filter shell, a drawoff pipe opening beyond the mass of softening material and extending to the outside of the container, the softening material being distributed in a body of uniform thickness with respect to the path of flow of water from the shell to the drawoff pipe, whereby to draw off water after it has passed through the filter and through the mass of softening material, means operable from outside the container to scrape the filter shell, and means to cause a flow of regenerative solution through the softening materials.

7. Water purifying apparatus comprising a water-tight container, a filtering shell of porous material situate inside the container and spaced away from the inner wall thereof, water-tight closures for the ends of the shell, a scraping device for cleaning the outside of the shell, an imperforate shell within the filtering shell spaced away therefrom and closed with a screen at each end, this inner shell being filled with zeolite, piping and valves adapted to admit raw water to the container outside the filtering shell and to draw off clear water after it has passed through the filtering shell and through the column of zeolite within the imperforate shell.

In testimony whereof, I sign my name.

MARTIN F. NEWMAN.

Witness:
EDWIN O. JOHNS.